United States Patent [19]
Martinelli

[11] Patent Number: 5,890,464
[45] Date of Patent: Apr. 6, 1999

[54] VARIABLE-CAPACITY INTAKE SYSTEM FOR A VEHICLE INTERNAL COMBUSTION ENGINE

[75] Inventor: Paolo Martinelli, Modena, Italy

[73] Assignee: Ferrari, S.P.A., Modena, Italy

[21] Appl. No.: 734,392

[22] Filed: Oct. 17, 1996

[30] Foreign Application Priority Data

Oct. 17, 1995 [IT] Italy .................................. T095A0837

[51] Int. Cl.⁶ ................................................. F02M 35/10
[52] U.S. Cl. ................................ 123/184.36; 123/184.21
[58] Field of Search ........................ 123/184.36, 184.35, 123/184.21, 432

[56] References Cited

U.S. PATENT DOCUMENTS

| | | | |
|---|---|---|---|
| 4,649,876 | 3/1987 | Ohmi et al. ............................. | 123/302 |
| 4,765,285 | 8/1988 | Kobayashi ......................... | 123/184.49 |
| 4,809,647 | 3/1989 | Masumoto et al. ................. | 123/184.36 |
| 4,957,071 | 9/1990 | Matsuo et al. ...................... | 123/184.36 |
| 5,000,129 | 3/1991 | Fukada et al. ...................... | 123/184.36 |
| 5,005,536 | 4/1991 | Suzuki et al. ....................... | 123/184.35 |
| 5,048,471 | 9/1991 | Takii et al. .......................... | 123/184.36 |
| 5,127,370 | 7/1992 | Suzuki et al. ....................... | 123/184.35 |

FOREIGN PATENT DOCUMENTS

| | | |
|---|---|---|
| 0 393 249 A1 | 12/1989 | European Pat. Off. . |
| 0 405 612 A1 | 2/1990 | European Pat. Off. . |
| 86 26 958.5 | 10/1986 | Germany . |
| 1-310118 (A) | 12/1989 | Japan . |
| 3015621 | 1/1991 | Japan . |
| 3130527 | 4/1991 | Japan . |
| 5280350 | 10/1993 | Japan . |
| 6-280576 | 4/1994 | Japan . |

*Primary Examiner*—David A. Okonsky
*Attorney, Agent, or Firm*—Shlesinger Arkwright & Garvey LLP

[57] ABSTRACT

A variable-capacity intake system for a vehicle internal combustion engine, and of the type presenting at least one intake conduit for each cylinder of the engine; a capacity in which said intake conduit terminates and which is connected to air supply means; an additional capacity; and valve means for selectively connecting at least part of the additional capacity to the intake conduit.

8 Claims, 1 Drawing Sheet

VARIABLE-CAPACITY INTAKE SYSTEM FOR A VEHICLE INTERNAL COMBUSTION ENGINE

BACKGROUND OF THE INVENTION

The present invention relates to a variable-capacity intake system for an internal combustion engine, in particular a high-performance GT car engine.

As is known, it is possible to enhance the volumetric efficiency of an internal combustion engine using a system, which provides for varying intake conditions and optimizing engine filling by determining resonance conditions in the system at different engine speeds. Increasing the volumetric efficiency of the engine provides to a certain extent for increasing power output for a given engine speed, reducing fuel consumption by burning the fuel better, and hence reducing the amount of pollutant exhaust gas produced.

The state of the art is familiar with intake systems for internal combustion engines, especially those of high-performance, e.g. GT, cars, in which the air intake conduits comprise so-called "trumpet" elements designed to vary their length to diameter ratio and so vary the intake conditions of the engine. Such elements are substantially of two types: a first presents a telescopic end conduit portion defined by two coaxial elements sliding one inside the other and which, by varying their axial position in relation to each other, provide for varying the length to diameter ratio (the length increasing or decreasing, and the diameter remaining constant); and a second presents an inlet portion comprising a pair of semicylindrical lobes hinged to each other and laterally superimposed to define a continuous-section conduit portion variable in diameter according to the extent to which the two lobes are parted.

In the case of engines with no trumpet elements, use is made, for each cylinder, of two parallel intake conduits of appropriate length and diameter and end-connected by a manifold fitted inside with a throttle valve. By controlling the throttle valve, it is possible to use either one or both of the conduits, thus changing the "equivalent diameter" of the resulting intake conduit, and so achieve resonance conditions for a given number of different engine speeds.

The above systems present the drawback of being relatively bulky and expensive; and the first, featuring telescopic trumpet elements, is also relatively delicate in terms of mechanical control.

SUMMARY OF THE INVENTION

It is an object of the present invention to provide a variable-capacity intake system for optimizing engine filling by determining resonance conditions in the system at predetermined engine speeds, and which at the same time is of straightforward, robust design, and ensures a high degree of reliability.

According to the present invention, there is provided a variable-capacity intake system for a vehicle internal combustion engine, and of the type comprising, for each cylinder of said engine, at least one intake conduit, and a capacity in which said intake conduit terminates and which is connected to air supply means; characterized by also comprising an additional capacity; and valve means for selectively connecting at least part of s aid additional capacity to said intake conduit of each cylinder.

Being straightforward in design, the above variable-capacity intake system is therefore highly reliable, inexpensive and compact, and also provides for optimizing engine filling by determining resonance conditions in the system at predetermined engine speeds.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 2:
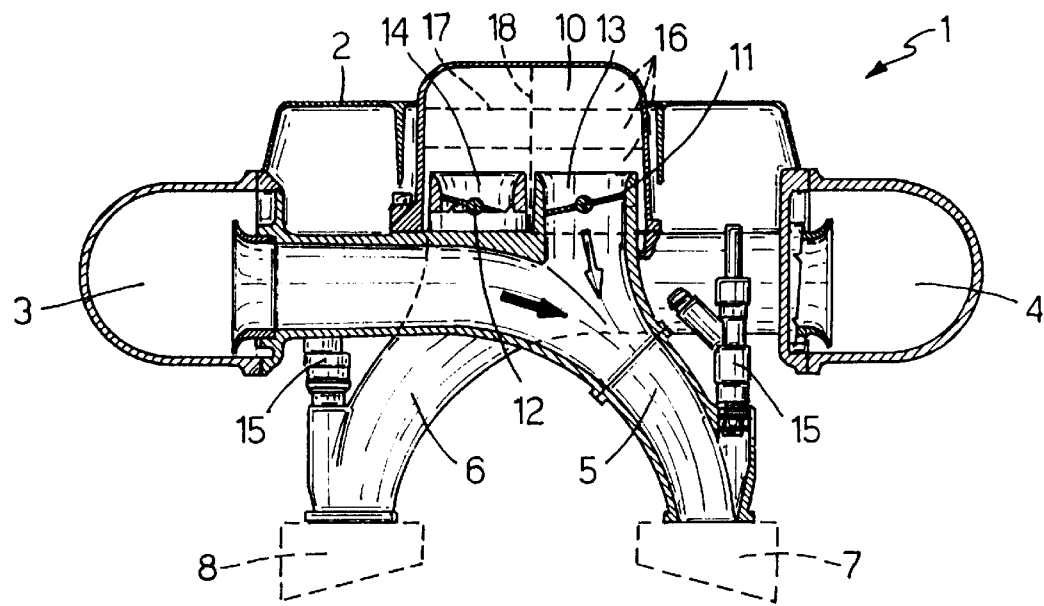
FIG. 2 shows a section along line II—II in FIG. 1.
Figure 1:
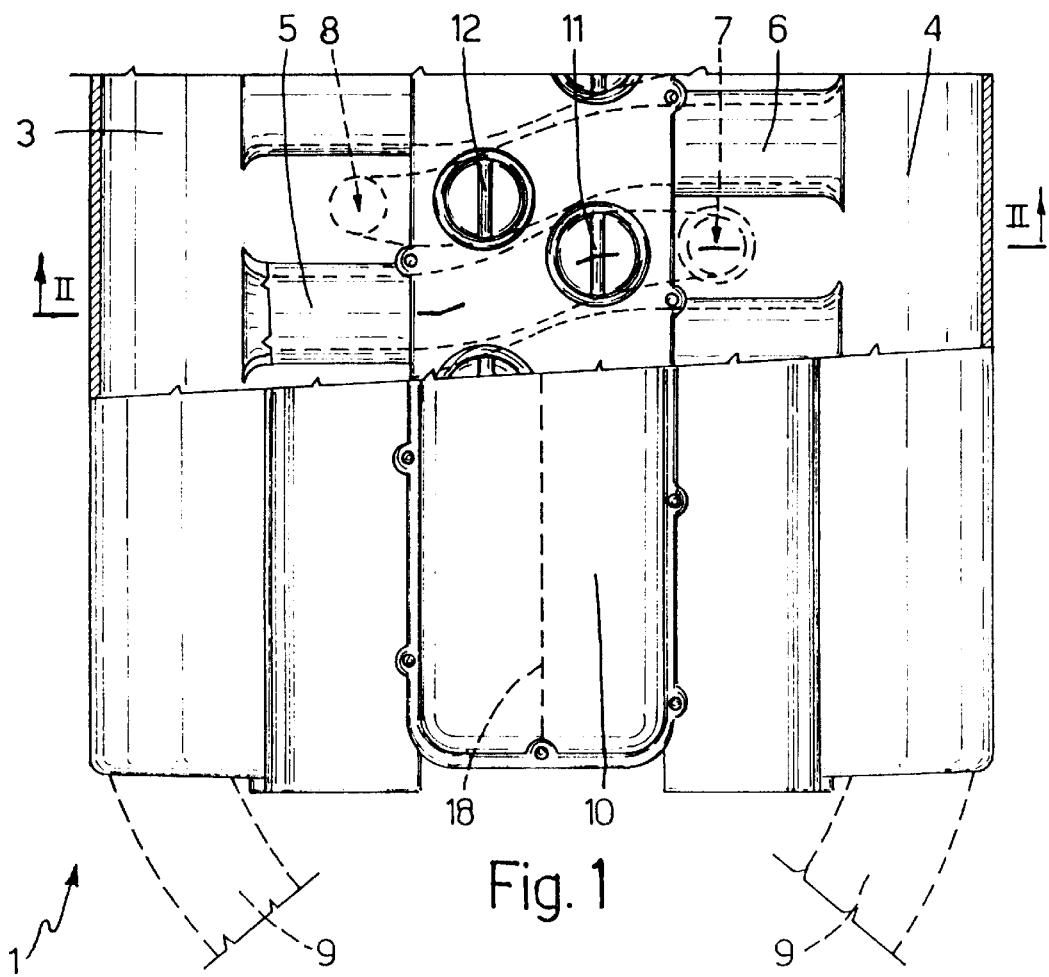
FIG. 1 shows a schematic top plan view of a variable-capacity intake system for a vehicle internal combustion engine in accordance with the present invention.

Number 1 in FIGS. 1 and 2 indicates a variable-capacity intake system for an otherwise known internal combustion engine (not shown) of any known type of vehicle (not shown), e.g. a GT car. Intake system 1 is fitted to the cylinder head 2 of the engine, and comprises two capacities 3 and 4 located facing each other on either side of cylinder head 2; and respective intake conduits 5, 6 connecting capacities 3, 4 to respective cylinders 7, 8 of two in-line blocks (of which only one cylinder 7 and one cylinder 8 are shown respectively) located parallel to capacities 3 and 4. Capacities 3, 4 are also connected in known manner (not shown in detail) to air supply means comprising, for example, respective conduits 9 for connection to a known air filter (not shown).

According to the present invention, intake system 1 also comprises an additional capacity 10 in the form of a closed chamber formed in cylinder head 2, between capacities 3 and 4 and over intake conduits 5, 6, and extending parallel to and along the full length of capacities 3 and 4; and ON/OFF valve means 11, 12 for selectively connecting intake conduits 5, 6, not only to respective capacities 3, 4, but also to additional capacity 10.

According to the preferred embodiment shown, intake conduits 5, 6 present a curved axis and are Y-shaped with respective lateral branches 13, 14 parallel to each other and terminating inside capacity 10; the valve means 11, 12 for connection to capacity 10 comprise throttle valves housed in known manner inside branches 13, 14; and each intake conduit 5 of a respective cylinder 7 of a first block crosses each intake conduit 6 of a respective cylinder 8 of a second block. That is, intake conduits 5 on one side of cylinder head 2 communicate with cylinders 7 of the block on the opposite side, and vice versa for intake conduits 6.

Downstream from the Y, i.e. downstream from respective branch 13, 14, each intake conduit 5, 6 is fitted with a respective fuel injector 15.

According to one variation, ON/OFF valve means 11, 12 may be replaced by valves (e.g. throttle valves controlled continuously throughout their travel) for continuously varying the inlet section of intake conduits 5, 6 inside additional capacity 10 as a function of varying engine speed. In which case, as opposed to comprising a closed chamber, capacity 10 must comprise a chamber connected hydraulically to capacities 3 and 4 and/or to air supply means 9.

According to a further variation, capacity 10 may be divided by partitions 17 into a number of transverse chambers 16, as shown by the dotted lines in the accompanying drawings, so as to feed each cylinder 7, 8 separately, or may be divided by a longitudinal partition 18 into two separate chambers, each connected to a respective block, to enable the use of two separate supply systems for the two blocks of cylinders 7 and 8.

In actual use, when throttle valves 11, 12 are closed (as shown), branches 13, 14 are closed and, for each block of cylinders 7, 8, the volume of intake system 1 involved in the intake stroke is that of respective capacity 3, 4 plus the volume of the single intake conduits 5, 6 serving each block. As such, intake conduits 5, 6 may be so sized at the design stage as to determine resonance conditions in system 1 at a predetermined engine speed and so optimize engine efficiency.

When valve means 11, 12 are opened (simultaneously or separately), the total volume of system 1 communicating with blocks of cylinders 7, 8 increases by an amount equal to the volume of additional capacity 10, thus varying the resonance conditions; and the volume of capacity 10 may of course be so calculated as to determine resonance conditions at other than the previous engine speed, so that, by simply controlling throttle valves 11, 12, optimum resonance conditions may be achieved for two different predetermined engine speeds to enhance the overall volumetric efficiency of the engine at different speeds.

I claim:

1. A variable-capacity intake system (1) for a vehicle internal combustion engine, comprising, in combination:
   a) a number of first intake conduits (5) supplying a first set of cylinders (7), and a number of second intake conduits (6) supplying a second set of cylinders (8);
   b) a first (3) capacity in which said first intake conduits (5) terminate and which is connected to air supply means;
   c) a second capacity in which said second intake conduits terminate and which is connected to said air supply means (9);
   d) an additional capacity (10) consisting of a closed chamber;
   e) valve means (11, 12) for selectively connecting at least part of said additional capacity (10) to each said intake conduit (5, 6) of said cylinder (7, 8); and
   f) said additional capacity (10) comprises a longitudinal partition (18) dividing said additional capacity (10) into two separate chambers each connected to a respective set of cylinders (7, 8); said sets presenting separate supplies (9).

2. A variable-capacity intake system (1) as claimed in claim 1, wherein said closed chamber constituting said additional capacity (10) is formed in a cylinder head (2) of said engine; and wherein said valve means (11, 12) are of the ON/OFF type.

3. A variable-capacity intake system (1) as claimed in claim 2, characterized in that said valve means (11, 12) are throttle valves.

4. A variable-capacity intake system (1) as claimed in claim 1, wherein said first (5) and second (6) intake conduits are curved and crossing each other so that each intake conduit (5, 6) serves a cylinder (7, 8) of a set on the opposite side to the respective said capacity (3, 4) in which the intake conduit (5, 6) terminates.

5. A variable-capacity intake system (1) as claimed in claim 4, wherein said first and second capacities (3, 4) are located laterally, facing each other on either side of a cylinder head (2) of the engine and are connected respectively to said first intake conduits (5) and to said second intake conduits (6); said additional capacity (10) being located on said cylinder head (2) and between and parallel to said two lateral capacities (3, 4).

6. A variable-capacity intake system (1) as claimed in claim 5, wherein said intake conduits (5, 6) are Y-shaped with respective lateral branches (13, 14) parallel to each other and terminating in said additional capacity (10); said lateral branches (13, 14) being fitted inside with said valve means (11, 12).

7. A variable-capacity intake system (1) as claimed in claim 6, wherein a fuel injector (15) is provided downstream from the Y of each of said intake conduits (5, 6).

8. A variable-capacity intake system (1) for a vehicle internal combustion engine, comprising, in combination:
   a) a number of first intake conduits (5) supplying a first set of cylinders (7), and a number of second intake conduits (6) supplying a second set of cylinders (8);
   b) a first (3) capacity in which said first intake conduits (5) terminate and which is connected to air supply means;
   c) a second capacity in which said second intake conduits terminate and which is connected to said air supply means (9);
   d) an additional capacity (10) consisting of a closed chamber;
   e) valve means (11, 12) for selectively connecting at least part of said additional capacity (10) to each said intake conduit (5, 6) of said cylinder (7, 8); and
   f) said additional capacity (10) is divided into a number of transverse chambers (16) by respective walls (17); each transverse chamber (16) being connected to a respective cylinder (7, 8).

* * * * *